Nov. 4, 1969

B. JACOBY, JR 3,476,376

SUPPORT STRUCTURE FOR HOLLOW ARTICLE

Filed Sept. 15, 1967

INVENTOR.
BEN JACOBY JR.

BY

D.R. Birchall
W.A. Schaich
ATTORNEYS

United States Patent Office 3,476,376
Patented Nov. 4, 1969

3,476,376
SUPPORT STRUCTURE FOR HOLLOW ARTICLE
Ben Jacoby, Jr., Dublin, Ohio, assignor to Owens-Illinois, Inc., a corporation of Ohio
Filed Sept. 15, 1967, Ser. No. 668,129
Int. Cl. B25b 1/18; B24b 9/12
U.S. Cl. 269—20          10 Claims

ABSTRACT OF THE DISCLOSURE

An apparatus for supporting a hollow glass article such as the funnel portion of a cathode-ray bulb while the edges are being worked upon. An array of arms paired together and acting in unison to move into engagement and disengagement with the exterior surface of a frusto-conical shaped article. A brake system for immobilizing the arms while the hollow article is being worked upon.

---

Figure 1:
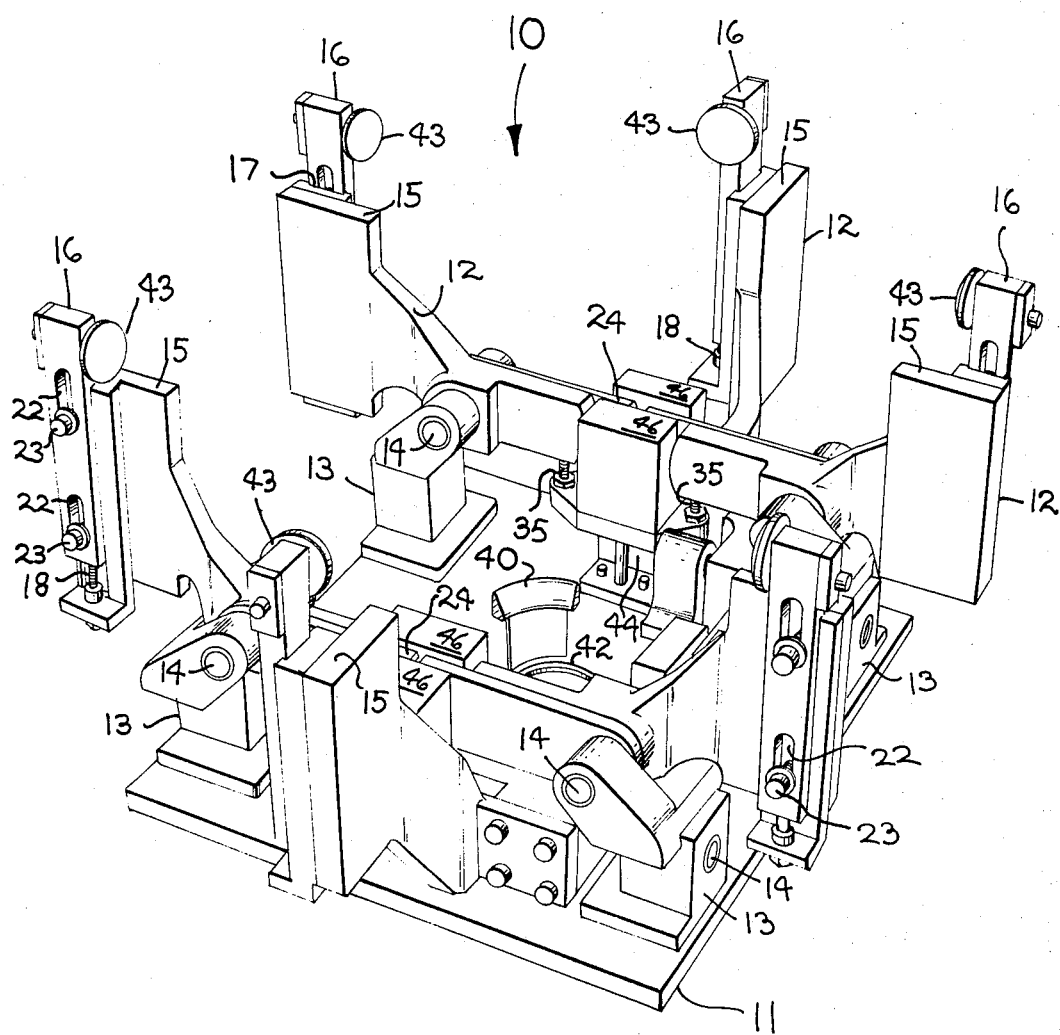

This invention relates to a fixture for supporting a hollow article from its exterior surface. More particularly, the present invention relates to a welding and grinding fixture useful in supporting the funnel or other portions of a cathode-ray tube by contacting the exterior surface thereof.

During the production of cathode-ray tubes, such as those employed in the television industry, it has been common practice to form the tubes in various pieces which are assembled into a unitary product known in the industry as a bulb. The viewing portion or faceplate is formed as a shallow dish with a short flanged sidewall. The rear portion of the cathode-ray bulb is known as the funnel, and is generally frusto-conical or frusto-pyramidal in configuration. The rear frusto-conical portion of the bulb is conventionally manufactured by placing a gob of molten glass into a press and forcing the glass into the desired configuration, or by placing a gob of molten glass into a mold and rotating the mold about its longitudinal axis, thus forcing the outside of the glass to assume the configuration of the mold. The interior configuration of the funnel will vary from a number of reasons, among which are physical differences from mold to mold, temperature differences of the molten glass, thermal variations applied to the funnel subsequent to forming, distortions resulting from handling and supporting the hot funnel, and variation in weight of the funnel. Therefore, it is quite desirable to orient and support the funnel from a position that is independent of the above pointed out variations.

Since practically the entire internal electrical assembly is supported from the interior surface of the bulb or from support points established therein, it is important that the geometry of the funnel be kept as symmetrically oriented about the longitudinal axis of the bulb as possible.

Longitudinal alignment of the funnel is a requisite since under the present day method of constructing a cathode-ray tube the funnel body is first formed and the thickened cylindrical section at the small end of the tube is removed by various methods including the application of thermal stresses coupled with a mechanically induced scratch or notch.

The funnel is then united with a cylindrical tubular section commonly known as the neck. The neck must be in alignment with the longitudinal axis of the bulb, and must be accurately positioned so that the electron gun components housed therein will produce an even sweep across the completed cathode-ray tube.

After the neck has been attached, the funnel is then supported primarily from its exterior surface and the peripheral edge around the large end of the funnel is ground so that the edge lies in a plane normal to the longitudinal axis of the bulb.

In brief, the present invention relates to a support fixture for supporting a cathode-ray tube funnel or other similar article from its exterior surface. The funnel is supported in the neck region, if desired, and a plurality of points near the wide end of the funnel. The support points of the large end of the funnel are coupled in pairs on pivotal supports that can move generally normal to the longitudinal axis of the funnel.

The primary object of this invention is to provide a support fixture that will hold frusto-conical parts in proper alignment by primarily contacting the exterior surface thereof.

An object of this invention is to provide a television tube funnel support fixture that will accurately position a funnel regardless of variations in its weight, thickness, or geometrical shape.

A further object of the present invention is to provide a fixture that can be used not only for orienting prior to grinding, but can also be used to accurately position the funnel for removal of the tip and the uniting of a tubular section therefater.

Further objects and advantages of the present invention will become apparent from the following description with particular reference to the accompanying drawings when considered in conjunction with the accompanying specification and appended claims.

Figure 2:
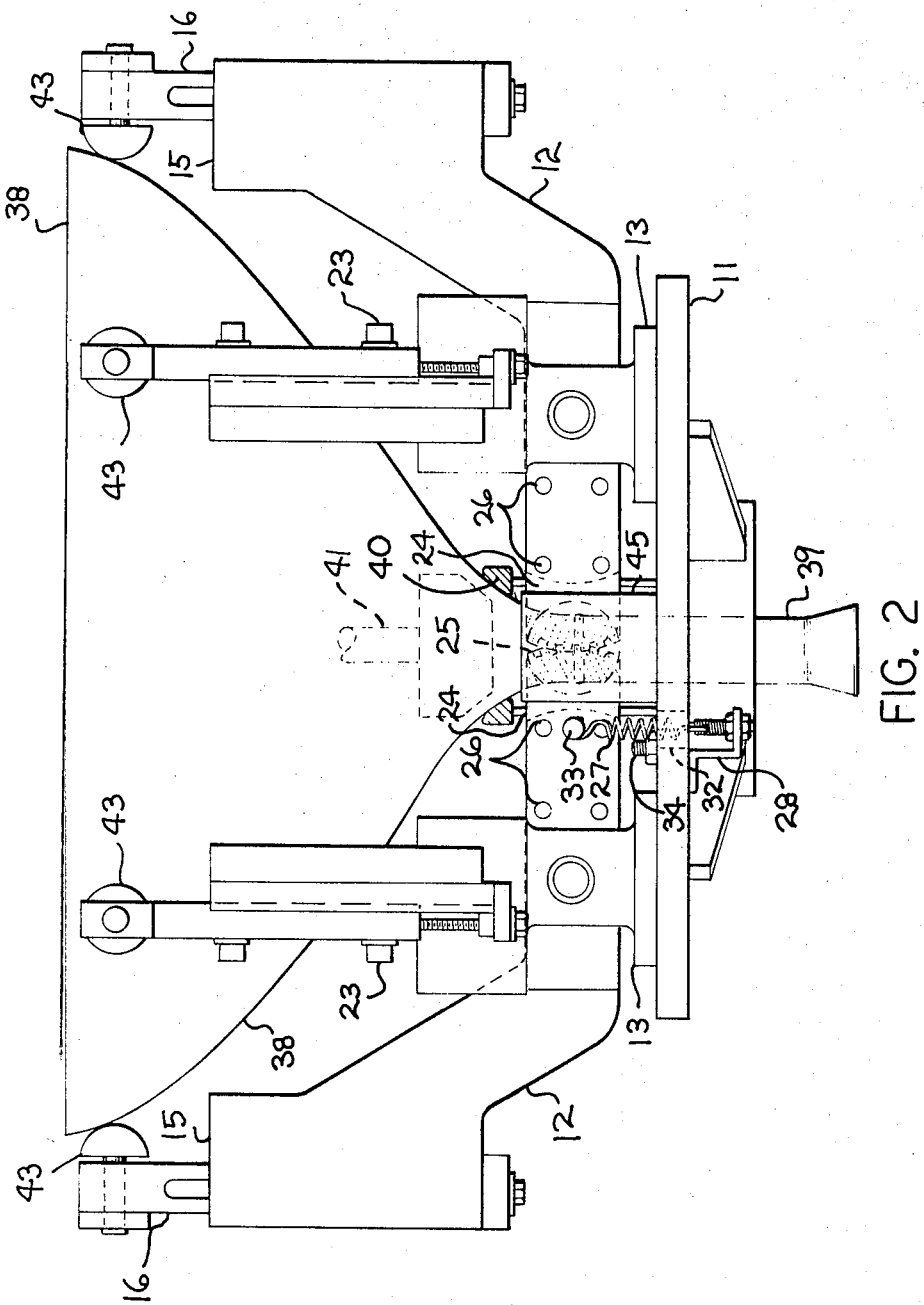
Figure 3:
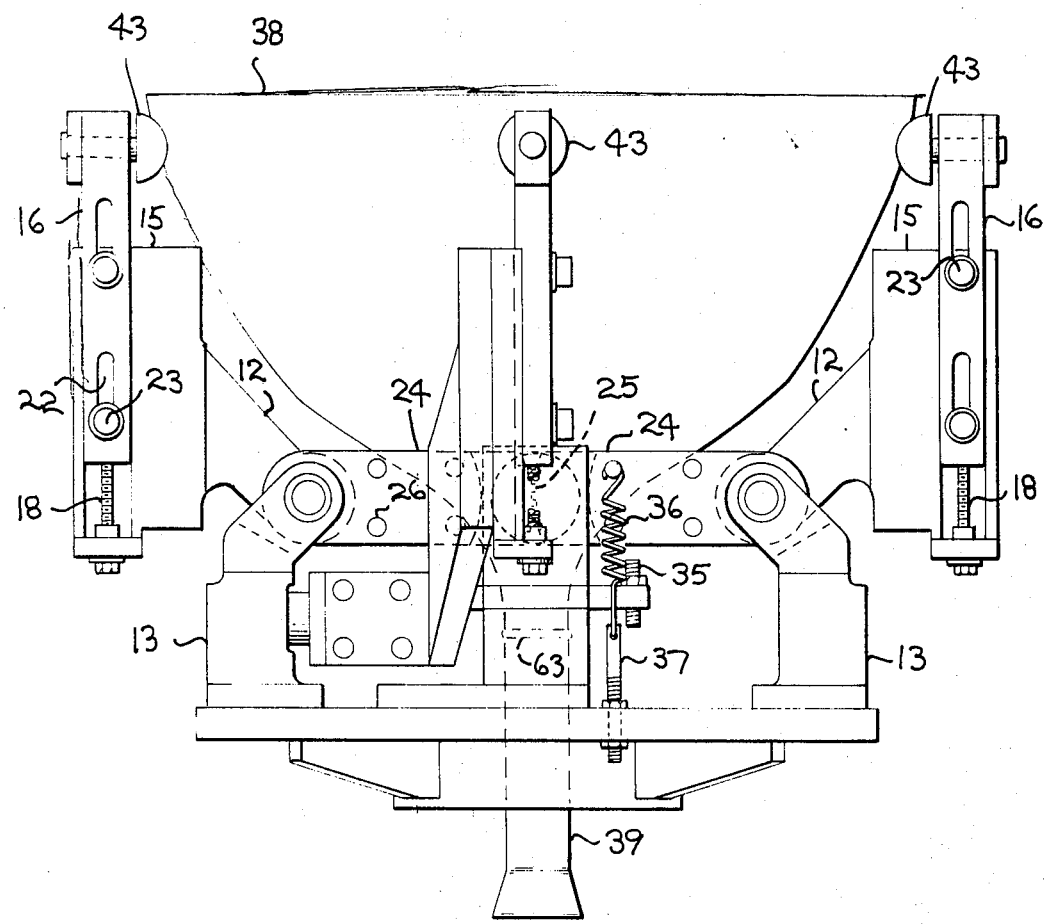
Figure 4:
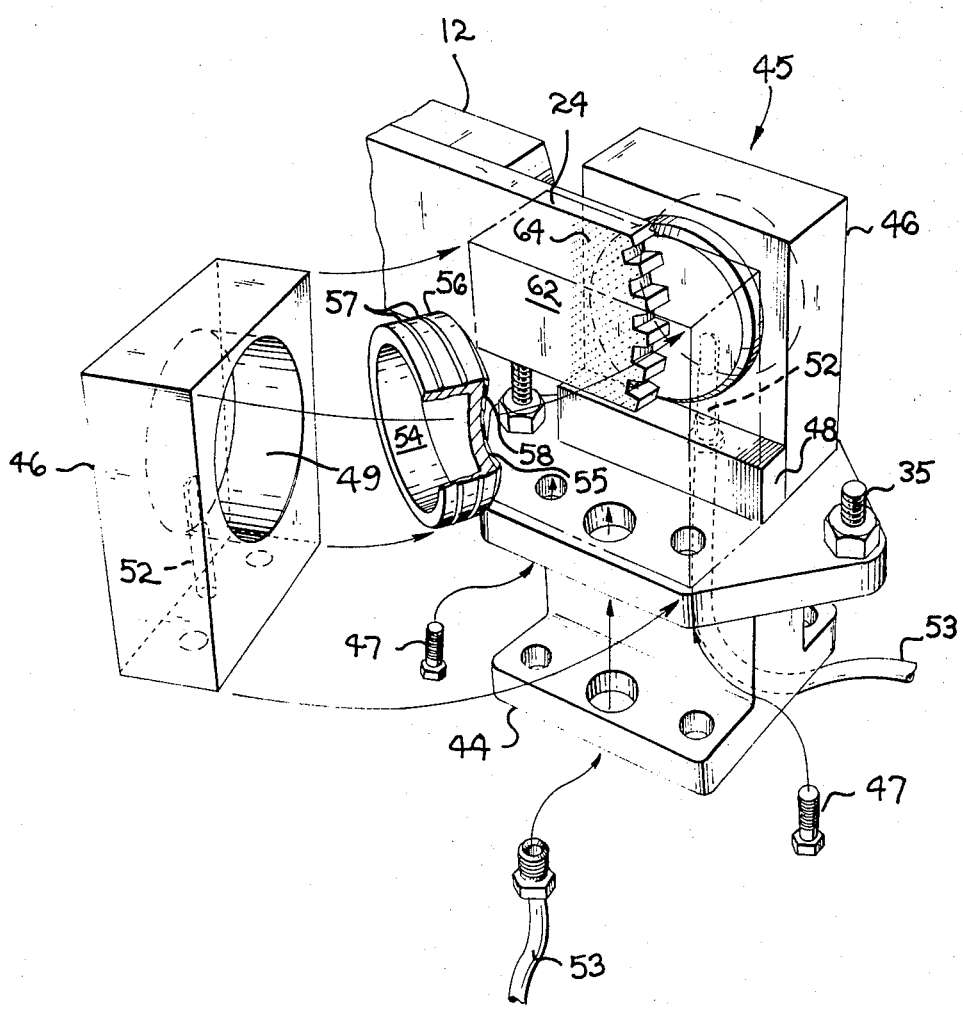

In the drawings:
FIG. 1 is a perspective view showing the apparatus of the present invention;
FIG. 2 is an elevational side view of the apparatus including a television funnel held within the apparatus;
FIG. 3 is an elevational end view of the apparatus and also shows a funnel positioned therein; and
FIG. 4 is a perspective broken away view of the locking mechanism associated with the support arms of the present invention.

Referring to the drawings wherein like reference characters designate corresponding parts throughout the several views, there is shown in FIG. 1 a fixture assembly identified by numeral 10. A base plate 11 of generally rectangular configuration contains a plurality of upwardly extending arms 12 that are pivoted near their attachment point to the base plate, thus permitting their free ends to move into and away from a television tube funnel supported therein. The upwardly extending arms 12 are coupled in pairs so that their free ends move toward each other or away from each other in unison. The arms are positioned on base plate 11 so that they are generally equally spaced around the periphery of a television tube. By way of example only, the presently described and illustrated assembly is adapted to accommodate a rectangular television tube funnel; consequently, a pair of support arms co-act with the short sides of the funnel and two pairs of arms are located along the long side of the funnel.

The funnel is supported near the apex region and is positioned within the array of upstanding arms which move in an outward direction as dictated by the external contour of the funnel. As soon as the funnel is positioned, the arms are locked in position by a clamping arrangement which will be described in more detail elsewhere. Thus, it will be evident that the apparatus of the present invention can receive a frusto-conical or frusto-pyramidal article and hold it in precise alignment for subsequent work operations.

Referring now to the drawings and in more detail, base plate 11 contains mounted thereto by conventional means (not shown) pivot blocks 13 which are cantilevered in an upward direction. An arm 12 is pivotally supported from the top of pivot block 13 by pin 14. The upwardly extending end 15 of arm 12 contains an adjustable bar 16 which can be moved along groove 17 in end 15 by threaded adjusting screw 18. Clamping of bar 16 is accomplished by the slotted holes 22 and bolts 23 which fit therethrough.

The end of arm 12 opposite end 15 is horizontally disposed and extends inward toward a similar arm that is mounted on the opposite side of base plate 11. The horizontally disposed end 24 contains a gear 25 on the outermost extremity as can be best seen in FIG. 2. Gear 25 meshes with a similar gear on the oppositely positioned arm 12. Thus, it becomes evident that when one of arms 12 pivots about pin 14, the other arm located directly across base plate 12 will also move in a correspondingly opposite direction because of the intermeshing of the gears 25 on the ends of the horizontally disposed ends 24 of arms 12. That portion of end 24 of arm 12 which contains the gear segments 25 can be bolted to arm 12 by bolts such as shown at 26 in FIG. 2.

FIG. 2 also shows the manner in which co-acting arms 12 are held in position against the funnel. A spring 27 is attached to an anchor bracket 28 which in turn is anchored to base plate 11. Spring 27 passes through an aperture 32 in base plate 11, and the end remote from the bracket attachment point is coupled to a pin 33 which protrudes from the side of end 24. Since spring 27 is a tension spring, it causes the horizontally disposed ends 24 of arms 12 to be pulled downward toward the top surface of base plate 11. The downward movement of ends 24 is arrested by an adjustable stop screw 34 which is threaded into the base plate 11.

As has been mentioned previously, the plurality of arms associated with the present apparatus are coupled together in pairs. The description of one pair of co-acting arms positioned along the short side of the apparatus has just been given and it applies equally well to the other pairs of arms located on the long side. The pair of arms positioned at the long sides of the apparatus are shown in FIG. 3 and are interconnected in pairs by gears 25. A stop for arresting the rotation of the arms along the side is provided by adjustable screws 35 which are anchored in one of the brake mounting blocks 44. The rotational movement of the arms along the long side is also controlled by a tension spring such as 36. Spring 36 is anchored to adjustable rod 37 which in turn is fastened to base plate 11.

When frusto-pyramidal television tube funnel 38 is positioned within the confinement of the present apparatus, the tubular portion 39 known as the neck protrudes through the opening 42 in the base plate. The exterior surface of the funnel will then rest against the support buttons 43 which are positioned on inwardly disposed surfaces of bars 16. In addition to support buttons 43, the exterior of the funnel will also rest against ring 40 which is attached to base plate 11 as shown in FIG. 1. If the apparatus is utilized as shown by way of example in the drawings, then the weight of the funnel will force the pairs of oppositely connected arms to open up a prescribed amount to accurately position the funnel. The amount of force exerted by arms 12 against the exterior of the funnel can be controlled by tension springs 27 and 36.

The apparatus of the present invention can also be used in the inverted position to accurately chuck a funnel that is supported on a cantilevered post such as that shown at 41 in FIG. 2 which fits into the apex region of the funnel. When used in the inverted position, controlled movement of the entire fixture or the post upon which the funnel is mounted can govern the amount arms 12 must open in order to accommodate the funnel. It will be evident to those skilled in the art that the aforementioned external support ring 40 and internal post 41 can be made to shift or be adjustable in a lateral direction to accommodates for mold wear and other small variations in overall funnel size.

Once the funnel has been accurately positioned by the fixture with its longitudinal axis coinciding with the corresponding axis of the fixture, the arms 12 must be immobilized before any additional forces can be applied to the funnel. The immobilization of all the arms is carried out simultaneously and is accomplished by the brake assembly 45 as shown in FIG. 4. Brake assembly 45 is mounted on brake block 44 on both pairs of arms located along the long side of the fixture and on the pair of arms located along the short side, the brake assembly 45 is mounted directly on base plate 11 as shown in FIG. 2.

Brake assembly 45 consists essentially of two halves or piston blocks 46 located in spaced apart juxtaposed position with respect to each other. Each piston block 46 is anchored to the top of the brake block 44 by bolts such as 47. Piston blocks 46 are spaced one from the other by spacer 48 which is slightly wider than the width of geared end 24 of arm 12.

Within piston block 46 is a piston cavity 49 of cylindrical configuration. Toward the back wall of piston cavity 49 is a fluid ingress aperture 52 which is in communication with fluid delivery line 53. A piston 54 having a planar frontal surface 55 is made to fit within piston cavity 49. A sealing engagement is made between the internal wall of piston cavity 49 and the exterior peripheral surface 56 by O-rings which are positioned in appropriate grooves in peripheral surface 56. The frontal surface 55 has attached thereto by a proper bonding agent an elastomeric wear or gripping surface 58.

During the operation of brake assembly 45, fluid pressure is introduced to the back side of piston 54 by means of fluid line 53 and aperture 52. The pressure thus induced forces piston 54 in an outward direction and causes gripping surface 58 to come firmly in contact with the side surfaces 62 of geared ends 24. Piston 54 will apply pressure to both geared segments of the two co-acting arms 12. To additionally aid in immobilizing geared ends 24 of arms 12, serrations have been placed in the surfaces 62 of geared ends 24. The serrations are shown at 64 in FIG. 4.

The two juxtaposed brake assemblies are connected to a common pressure supply; consequently, elastomeric wearing surfaces 58 of pistons 54 will be brought to bear simultaneously against both sides of the geared ends 24. In this manner, arms 12 can be held in a fixed position without suffering the consequences of any undue lateral force.

When the grinding or other operation is completed upon the glass funnel positioned within the fixture, the pressure is released from behind pistons 54, thus freeing arms 12 so that they are once again free for rotation and releasing of the part confined therein. In order to have all the pairs of arms act simultaneously, the fluid pressure delivery lines 53 are all coupled together to a common pressure supply.

The present invention can be utilized to support completed glass funnels for inspection purposes as well as for facilitating the grinding of the external edge at the large end of the funnel. The previously described apparatus can also be used to rigidly and accurately hold a newly made funnel while the neck portion is cracked off by the application of heat or other crack producing stresses. The same fixture can be also used to weld the neck 39 to the funnel at a weld joint such as at 63 as shown in FIG. 3.

One of the added advantages of the present device over the commonly used internal chucking devices is that there is less chance of damaging the glass funnels as they are inserted and removed from the chucking fixture. The hardware necessary for internal chucking produced cracks and chips along the funnel edge unless the operator was exceedingly careful. More accurate chucking can be obtained by externally grasping the funnel since the exterior of the funnel surface is controlled during the manufacture thereof by the inside of the mold. Another advantage of the present invention which is afforded by the external chucking capabilities of the heretofore described apparatus is that positioning bosses (not shown), which are located around the periphery at the large end of the funnel, can be ground to very accurate tolerances. Such grinding can be accomplished on funnels that have been initially formed by the "spin against a ring" method of centrifugal casting.

As has been pointed out previously, the present invention has been set forth in terms of a rectangular cathode-ray tube; however, it will work equally well for a tube wherein the frontal or viewing surface is round. In a round funnel application, the length of the arm assemblies can be adjusted so that the support buttons they carry are all equidistant from a vertical axis that passes upward normal to the base plate of the apparatus. A unique capability of the present invention resides in the fact that it can align the major axis of a rectangularly shaped funnel so that it coincides with the major axis of the fixture. When a funnel is introduced into the fixture, it may not be oriented for perfect reception by the fixture. As the buttons 43 of arms 12 initially contact the exterior of the unoriented funnel, it will undergo a rotation until proper alignment is achieved. The fixture has the capability of rotating the funnel as much as 20 degrees. The rotation is achieved by the inwardly biasing action of arms 12 and also because there are two pairs of arms positioned along the sides of the funnel corresponding to the major axis thereof.

Thus, it can be ascertained that the present invention heretofore described sets forth an apparatus that forces a frusto-conical or frusto-pyramidal article to assume a symmetrical position, regardless of the variance of its wall thickness from one part to the next. By having the entire periphery arranged in a symmetrical fashion, the article can be worked upon in a manner well within allowable tolerances. The self-centering ability of the present invention is achieved by permitting the pairs of contact arms to move in unison as they follow the contour of the glass part that was established by the mold in which the part was originally cast.

While certain representative embodiments and details have been shown for the purpose of illustrating the invention, it will be apparent to those skilled in this art that various changes and modifications may be made therein without departing from the spirit or scope of the invention.

What is claimed is:

1. A fixture for supporting an article with externally tapered sidewalls including base support means with a plurality of pivotal positioning means attached in an upright manner therefrom, means associated with said positioning means to cause at least some of said positioning means to be responsive to the movement of other of said positioning means, and means attached to said base support means to immobolize the movement of said positioning means when they have assumed the desired attitude against the exterior of said article.

2. A fixture for supporting an article with externally tapered sidewalls that converge at a common apex, base support means with an array of spaced apart article positioning means pivotally connected to said base support means with at least one outstanding arm for contacting said article, means associated with said positioning means to cause each of said positioning means to be responsive to the movement of at least another of said positioning means, and brake means attached to said base support means and associated with said positioning means to stop the movement of said positioning means when the correct position against the exterior of said article has been obtained.

3. A fixture for supporting an article of frusto-pyramidal external configuration including a base support structure having a plurality of positioning arm support blocks attached thereto in cantilevered fashion, elongate positioning arms each having a first end and a second end and pivotally attached at a point remote from the ends thereof to said support block, said firest end adapted for contacting the exterior of said article, said second end adapted for co-acting with a similar end of an adjacent positioning arm so that the one arm is responsive to the movement of the adjacent arm, and brake means attached to said base support structure and biased against said arms to stop the rotation of said arms when said article has attained the desired position.

4. In a fixture for supporting a hollow glass article of frusto-pyramidal external configuration including a generally planar base support structure having a plurality of pairs of positioning arm support blocks attached thereto in cantilevered fashion, elongate positioning arms each having a first end and a second end and pivotally attached near the center thereof to said support blocks, said first end protruding in a direction away from said base support structure and having adjustable article contacting means attached thereon, said second end generally disposed parallel to said base support structure and containing a gear segment with teeth that intermesh with the teeth of a juxtaposed positioning arm end thus causing one arm to be responsive to the movement of a juxtaposed arm, and brake means attached to said base support structure so that a force may be applied to said arms at the gear segments to stop the rotation of said arms when said article has attained the desired position.

5. A support fixture as claimed in claim 4 wherein the adjustable article contacting means on the end of said first end comprises an elongate bar that can be moved to the desired position by means of an adjustment screw and an article support button attached to the end of said bar for contacting the exterior of said hollow glass article.

6. A support fixture as claimed in claim 4 wherein said base support structure contains a centrally located aperture to permit the apex portion of said hollow glass article to protrude therethrough.

7. A support fixture as claimed in claim 4 wherein said brake means is comprised of at least one brake block with a movable piston therein that can be moved into engagement with the gear portions of a pair of positioning arms.

8. A support fixture as claimed in claim 4 wherein said brake means is comprised of a pair of brake blocks with movable pistons therein positioned in juxtaposed orientation on each side of the gear portions of a pair of positioning arms whereby outward movement of said pistons will cause them to be biased against both sides of the gear portions of a pair of positioning arms.

9. A support fixture as claimed in claim 4 wherein the sides of the gear portions on the ends of the arms are generally flat and contain serrations to aid in the immobilization of the arms when under the influence of said brake means.

10. A support fixture as claimed in claim 8 wherein the front face of the pistons associated with said brake means is generally planar and contains attached thereto an elastomeric pad for co-acting with the surfaces of said gears.

References Cited

UNITED STATES PATENTS 2,948,988 8/1960 Stutske et al.
3,364,628 1/1968 Bennett _____ 269—104 X
3,385,592 5/1968 Hassell et al. _____ 269—287

ROBERT C. RIORDON, Primary Examiner

U.S. Cl. X.R.

51—227; 269—287